F. M. LINDERMAN.
BELT FASTENER.
APPLICATION FILED AUG. 5, 1914.
1,137,410. Patented Apr. 27, 1915.
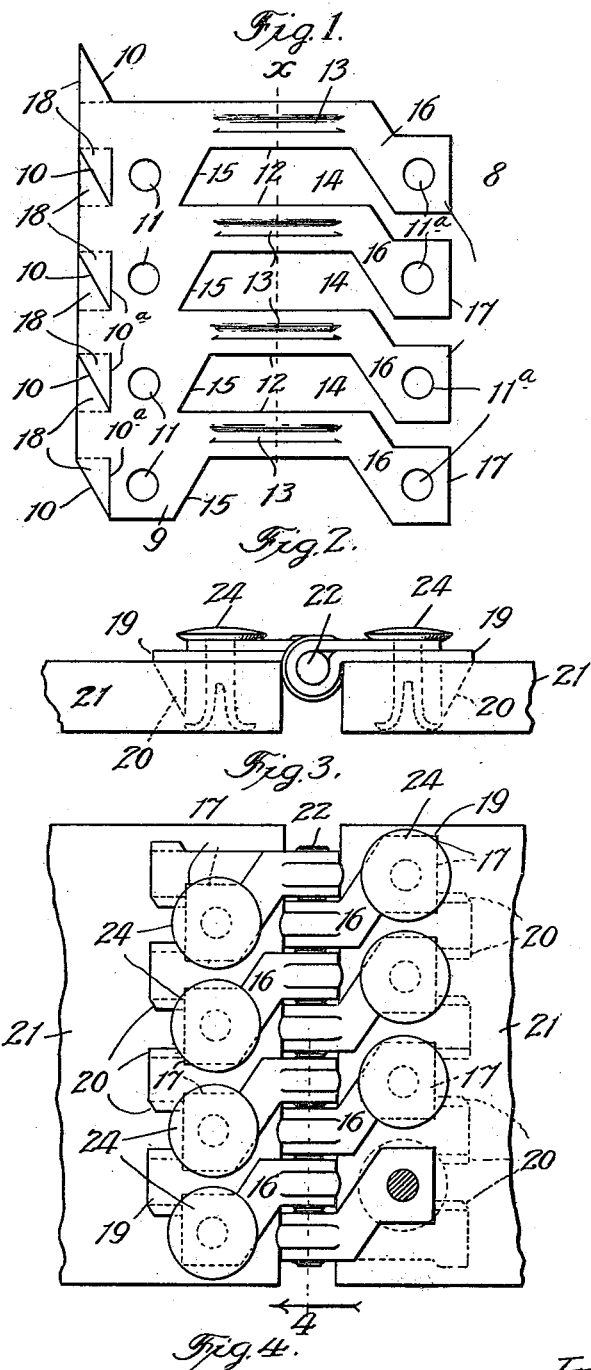

UNITED STATES PATENT OFFICE.

FRANK M. LINDERMAN, OF CHICAGO, ILLINOIS.

BELT-FASTENER.

1,137,410.　　　　Specification of Letters Patent.　　Patented Apr. 27, 1915.

Application filed August 5, 1914.　Serial No. 855,256.

*To all whom it may concern:*

Be it known that I, FRANK M. LINDERMAN, a citizen of the United States, residing at Chicago, in the county of Cook and State of Illinois, have invented a new and useful Improvement in Belt-Fasteners, of which the following is a specification.

My invention relates to an improvement in the class of fasteners for fastening together the ends of machinery-belts.

The primary object of my invention is to provide a construction of belt-fastener having both rivet holes and penetrating points to adapt the device to its purpose by employing the points to penetrate the material of the belt in applying the fastener thereto, and rivets to be driven through the fastener at the rivet-holes therein and through the belt and clenched on the obverse side of the latter to securely fasten the belt-ends together.

In the accompanying drawing, Figure 1 is a plan view of a blank from which to produce my improved belt-fastener in its preferred form; Fig. 2 shows an end view of two of the fasteners, each formed out of one of the aforesaid blanks, hinged together and connecting the ends of a belt; Fig. 3 is a plan view of the showing in Fig. 2, and Fig. 4 is a section on line 4, Fig. 3.

The blank 8 (Fig. 1) is stamped out of sheet-metal to form a body-section 9 with diagonal cuts 10 at intervals in one edge, extending at their inner ends to horizontal cuts $10^a$, and rivet holes 11 in line with the cuts; and arms 12 extending parallel with each other from the opposite edge of the body and containing longitudinal concavo-convex grooves 13, the arms, which are separated by uniformly wide spaces 14 having diagonal bases 15, being extended diagonally, all in the same direction, as necks 16 terminating in rectangular heads 17 containing rivet holes $11^a$, each in line with a rivet hole 11. The sections between the cuts 10 and $10^a$ form points 18 to be bent into prongs as hereinafter described.

To form a blank 8 into a belt-fastener 19, the blank is bent upon itself along a line indicated at $x$ in Fig. 1 midway between the ends of the grooves 13, which extend midway between the cuts $10^a$ and the outer edges of the heads 17, whereby when the blank is thus bent, those edges coincide with the said cuts, and the points 18 lie in advance of the same, while the holes $11^a$ and 11 coincide in pairs. The points are bent, in pairs, toward each other, as indicated in Fig. 3, to form prongs 20, which in all cases should be shorter by about one-sixteenth of an inch than the thickness of the material forming a belt 21 the ends of which are to be connected.

To flexibly connect together the ends of a belt, using for the purpose my improved fastener thus described, a corrugated pintle 22, of metal or other suitable material, is employed for hinging two of the fasteners together. The fasteners are bent, in intermeshing relation to each other, as shown in Fig. 3, about the pintle to extend in opposite directions therefrom, the opposite sections of the grooves 13 then embracing the raised portions 23 of the corrugated pintle to form hinge-knuckles therefor, according to the invention of my Letters Patent No. 982,374, and prevent longitudinal displacement of the pintle. The prongs 20 on the two fasteners are driven into the end-portions of the belt 21 to be connected, to join them together and resist the longitudinal strains in the use of the belt, and the fasteners are secured in place through the medium of bifurcated rivets 24 driven through the coincident rivet holes $11^a$ and 11, these rivets being of a length to pass entirely through the thickness of the belt material and beyond its obverse surface, which lies against a suitable anvil in driving the rivets and prongs, whereby in driving the rivet-ends spread apart and the rivets are clenched on the belt.

What I claim as new and desire to secure by Letters Patent is:

1. A belt-fastener of sheet-metal, comprising a body-section having prongs projecting at right angles from it in pairs at intervals along one edge and provided with rivet holes adjacent to the prongs, and spaced arms extending from the opposite edge of said section, provided on their ends with diagonally projecting necks terminating in spaced heads containing rivet holes, said arms being bent upon themselves between their ends, thereby bringing the rivet holes in the heads respectively coincident with those in the body-section and the outer edges of the heads adjacent to the base-line of the prongs.

2. A belt-fastener of sheet-metal, comprising a body-section having prongs cut out of one edge forming pairs projecting at right-angles from said section, the members of each pair having respectively opposite straight and diagonal edges, rivet holes in said section adjacent to the prongs, and spaced arms extending from the opposite edge of said section, provided on their ends with diagonally projecting necks terminating in spaced heads containing rivet holes, said arms being bent midway between their ends upon themselves to form hinge-knuckles at the point of bending, thereby bringing the rivet holes in the heads respectively coincident with those in the body-section and the outer edges of the heads short of the base-line of the prongs.

FRANK M. LINDERMAN.

In presence of—
A. C. FISCHER,
F. A. FLORELL.

Copies of this patent may be obtained for five cents each, by addressing the " Commissioner of Patents, Washington, D. C."